US008954474B2

(12) United States Patent
Dahl et al.

(10) Patent No.: US 8,954,474 B2
(45) Date of Patent: Feb. 10, 2015

(54) MANAGING DATA SYSTEMS TO SUPPORT SEMANTIC-INDEPENDENT SCHEMAS

(75) Inventors: Mark A. Dahl, Kent, WA (US); Edward J. Levinskas, St. Charles, MO (US); Patrick L. Walsh, Bothell, WA (US); Russell G. Gianni, Yorba Linda, CA (US); James G. Tanner, Bellevue, WA (US); Roberto Aaron Vergaray, Granite Falls, WA (US)

(73) Assignee: The Boeing Company, Chicago, IL (US)

( * ) Notice: Subject to any disclaimer, the term of this patent is extended or adjusted under 35 U.S.C. 154(b) by 1784 days.

(21) Appl. No.: 12/106,996

(22) Filed: Apr. 21, 2008

(65) Prior Publication Data

US 2009/0265378 A1    Oct. 22, 2009

(51) Int. Cl.
*G06F 17/30* (2006.01)
(52) U.S. Cl.
CPC ................................ *G06F 17/30908* (2013.01)
USPC ........... 707/794; 707/776; 707/796; 707/809; 706/55; 711/137; 711/141; 715/225; 715/234

(58) Field of Classification Search
CPC ............ G06F 17/22; G06F 17/30; G06N 5/02
USPC ........... 1/1; 715/234, 255; 707/776, 794, 796, 707/809; 706/55; 711/137, 141
See application file for complete search history.

(56) References Cited

U.S. PATENT DOCUMENTS

| 8,812,553 | B2 * | 8/2014 | Trog et al. ..................... 707/794 |
| 2002/0038301 | A1 * | 3/2002 | Aridor et al. ..................... 707/10 |
| 2004/0083199 | A1 * | 4/2004 | Govindugari et al. ............ 707/1 |
| 2004/0139095 | A1 * | 7/2004 | Trastour et al. ............... 707/100 |
| 2004/0194016 | A1 * | 9/2004 | Liggitt ....................... 715/501.1 |
| 2005/0278349 | A1 * | 12/2005 | Chinnappa et al. ........... 707/100 |
| 2006/0074980 | A1 * | 4/2006 | Sarkar ........................ 707/104.1 |
| 2006/0101058 | A1 * | 5/2006 | Chidlovskii .................. 707/102 |
| 2006/0242124 | A1 * | 10/2006 | Fields et al. ....................... 707/3 |

* cited by examiner

*Primary Examiner* — Dennis Truong

(57) ABSTRACT

A method of maintaining data described in a plurality of data models. An ontology is used to describe the data models. The data models are managed using the ontology and using a validation schema to validate object(s) governed by the ontology and derived from data-centric component(s) of content that has a semantically independent structure. Management of the data models is neutral relative to implementation of the content.

20 Claims, 4 Drawing Sheets

MANAGING DATA SYSTEMS TO SUPPORT SEMANTIC-INDEPENDENT SCHEMAS

FIELD

The present disclosure relates generally to information systems, and more particularly (but not exclusively) to a method of managing data to support referencing of the data in content according to a semantic-independent schema.

BACKGROUND

The statements in this section merely provide background information related to the present disclosure and may not constitute prior art.

In a large enterprise, information is gathered and used for many purposes. Various users within the enterprise may use the same data in different ways for different applications. Even where data is maintained in a single repository, it is often the case that different users model the same data in different ways for different uses. Such models can be incompatible and can change over time as user needs evolve.

SUMMARY

The present disclosure, in one implementation, is directed to a method of maintaining data described in a plurality of data models. An ontology is used to describe the data models. The data models are managed using the ontology and using a validation schema to validate object(s) governed by the ontology and derived from data-centric component(s) of content that has a semantically independent structure. Management of the data models is neutral relative to implementation of the content.

In another implementation, the disclosure is directed to a method of managing data to support usage of the data in content in accordance with a semantic-independent schema. Concepts of a plurality of models of the data are described in an ontology. The method includes structuring content in accordance with the semantic-independent schema, the structuring including embedding in the content one or more data-centric components transformable to incorporate data into the content without affecting the other components of the content structure. A validation schema is derived from the ontology. The validation schema is used in creating a transform for extracting one or more objects from the data-centric components and validating the object(s) derived from the data-centric component(s).

In yet another implementation, the disclosure is directed to a method of managing data for incorporation into content. The data is described in a plurality of data models changeable over time. The method includes describing the data models in an ontology. A structure is provided for the content using a semantic-independent schema. Included in the content structure are one or more data-centric components transformable to relate semantically to the ontology and configured to allow semantic-independent implementation of the content structure. The method includes transforming and semantically relating the data-centric component(s) to the ontology, and validating the transformed components relative to the ontology to manage the data models.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure, in one implementation, is directed to a method of managing data to support referencing of the data in content that is structured as semantic-independent. Such content may be structured in accordance with a semantic-independent schema, i.e., a schema that by design does not model the subject matter of the data. Such schemas may be used, for example, to model document structure or coarse-grained topic structures as done with DITA (Darwin Information Typing Architecture). In various implementations of the disclosure, semantic-independent schemas may be used for context-dependent data retrieval and document publishing as further described below. The present disclosure, however, is not so limited. It should be understood that various implementations are contemplated in relation to other or additional types of semantic-independent schema and semantic-independent content.

Figure 1:
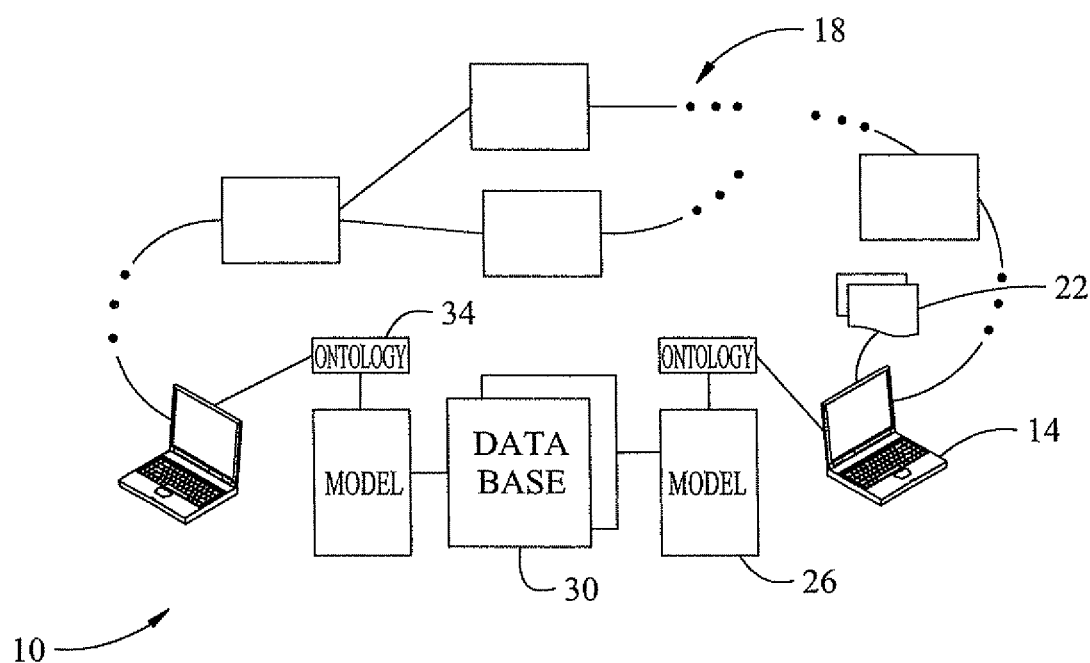
FIG. 1 is a diagram of an information system in which various methods may be implemented in accordance with one implementation of the present disclosure.

In some aspects, the disclosure is directed to a software-implemented method of building ontologies that can be used to govern, standardize, and map various data systems used across an enterprise or field of business, including but not limited to the aerospace business. One exemplary configuration of an enterprise information system in which methods may be implemented in accordance with the disclosure is indicated generally in FIG. 1 by reference number 10. The system 10 includes a plurality of computers 14 including processors and memory configured, e.g., into one or more networks. The system 10 includes various network servers, data repositories, input/output devices, network user terminals, etc., indicated generally by reference number 18. A plurality of documents 22 and/or other types of content may be produced and kept and/or distributed in the course of business of the enterprise. Of course, those skilled in the art will recognize that there are many different ways in which such an information system and its content could be configured.

In the information system 10, a plurality of data models 26 are used to manage data kept in database(s) 30. The data models 26 may change over time as the data and data descriptions change and/or grow. Further, it is not necessary for a model 26 to be semantically compatible with other models 26, e.g. as might be the case where multiple or evolving viewpoints are being modeled. As further described below, one or more ontologies 34 are used to manage the data models 26.

Figure 2:
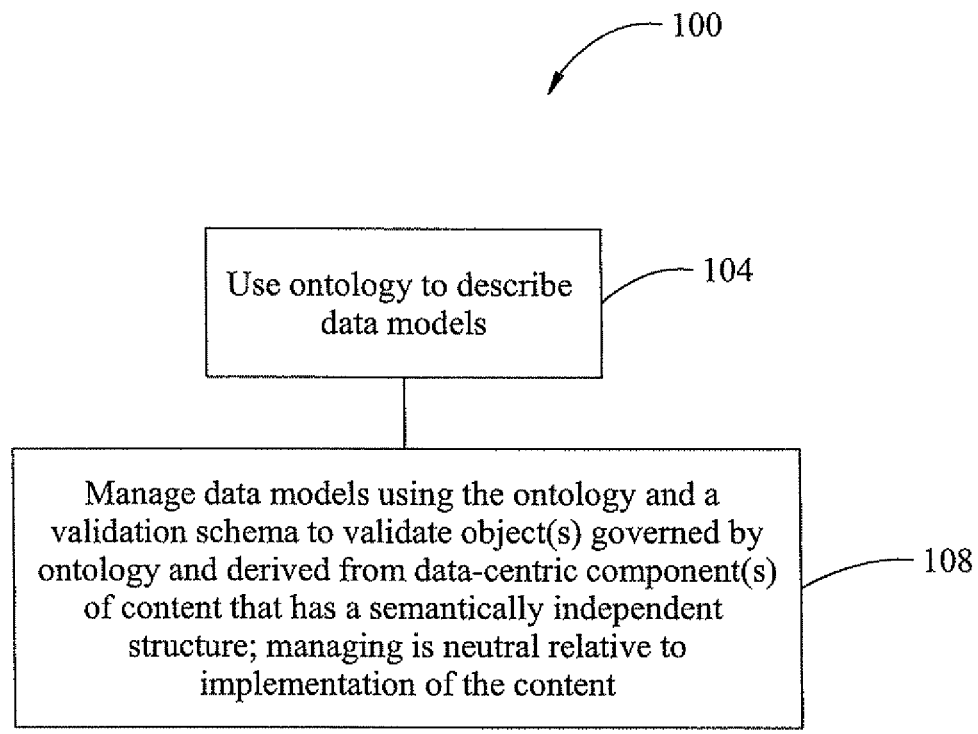
FIG. 2 is a flow diagram of a method of managing data in accordance with one implementation of the present disclosure.

In some implementations, the ontologies 34 are part of a master information modeling method used in the information system 10 to manage data represented by the plurality of data models 26 in use in the system 10. A method of managing data in accordance with one implementation of the disclosure is indicated generally in FIG. 2 by reference number 100. The method 100 may be performed to support semantic usage of the data in content according to a semantic-independent schema. The method 100 may be used, for example, to manage very large repositories of documents (that may hold as many as or more than 100,000 documents) in a scalable manner. In process 104, concepts and relationships of the data models 26 are described in an ontology 34. In process 108, the data models 26 are managed using the ontology 34. A validation schema derivable from the ontology 34 is used to validate one or more objects governed by the ontology and derived from the data-centric component(s) of content such as a document 22 that has a semantically independent structure. The managing is neutral relative to implementation of the content. It should be noted that data validated in such manner can be regarded by various users of the system 10 as authoritative (due to the single-sourcing of data).

Figure 3:
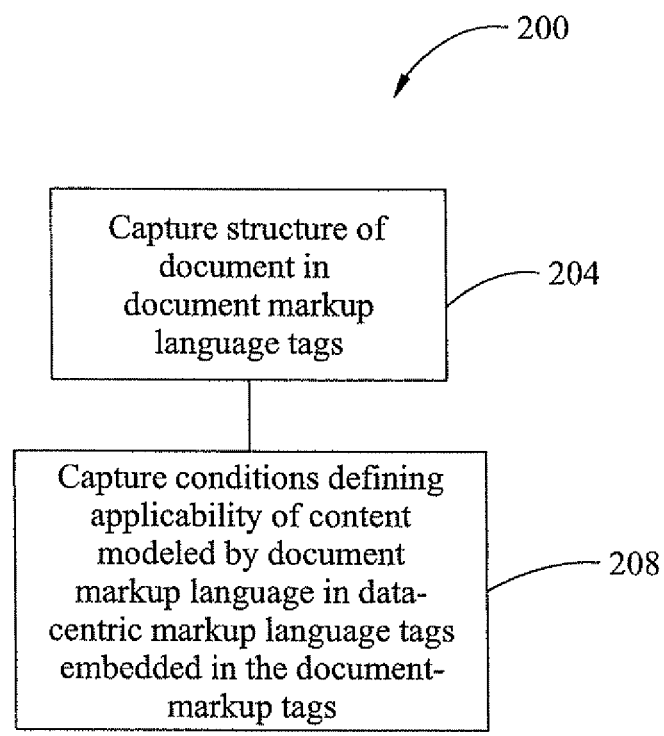
FIG. 3 is a flow diagram of a method of structuring content in accordance with a semantic-independent schema in accordance with one implementation of the present disclosure.

In some implementations, XML (Extensible Markup Language) is used in a data modeling approach that provides for a single-source representation of conceptual and document structures allowing for partially structured content. This data modeling approach supports both discrete data extraction and traditional publishing of documents. One implementation of a method of structuring content in accordance with a semantic-independent schema is indicated generally in FIG. 3 by reference number 200. The method 200 may be used, e.g., to structure a document 22 so that context-dependent, discrete data may be retrieved from the information system 10 as well as being included in the published document. In process 204, a structure of the document is captured in a set of tags that include a document markup language. Any markup language could be used that includes common elements such as paragraphs, tables, and figures. One or more document root elements also are used. Document section elements may be nested to any depth appropriate to the content. Nested section elements may be, e.g., as follows:

```
<section number="1.0"> text here <section number="1.1"> sub-text
</section></section>
```

Other or additional types of element nesting are allowed to show parent-child relationships in the content. For example, if a bulleted list of items is subordinate to a paragraph, the element tag for the list element is nested under the element tag for the paragraph element. An example follows:

```
<paragraph> some text
<list><element>one</element><element>two</element></list>
</paragraph>
```

All document elements belong to one or more namespaces. Such namespaces may include common document tags, mathematical tags, etc., and/or tags for specialized documentary uses.

In process 208, conditions defining applicability of content modeled by the document markup language are captured in a set of tags that include a data-centric markup language. The data-centric tags are embedded in the document-markup tags. Conditions of the data-centric markup language include the following characteristics. The tags exist in a namespace separate from namespace(s) used for the document markup language. The data-centric markup defines a Boolean expression that can be evaluated via software configured to interpret the XML semantic-independent schema. For example, a prefix notation may be used in which operators are elements and operands are nested elements. Other notations could be used, for example, an infix notation could be used where operator elements appear between operand elements.

The Boolean expressions include reference to variables that are assigned at the time a user accesses the document (and can provide input based on the specific user scenario in play). Variables represented in the conditions are represented abstractly in the XML using a variable tag with the variable name provided as an attribute. For example, a variable tag may appear as follows:

```
<variable name="x">
```

It should be noted that variable names used in conditional expressions are not part of the XML schema (but are managed externally by an ontology or master information model, e.g., an ontology 34). Accordingly, the schema need not change when variables are added to or removed from a document validated by the XML schema. In relation to FIG. 1, the document may be stored in database 30, which may or may not hold other or additional types of data. The XML schema may be stored as a data model 26.

A conditional expression conditionalizes a given XML tree structure of document markup. The type of markup structure is not important, as long as it is semantically independent. In some implementations, the condition is placed as the first child element of the tree structure. In other implementations, a conditional expression is allowed to wrap what is being conditioned. Placing a conditional expression as the first child element allows it to be conveniently rendered to support a document view. Such placement also allows the continued use of existing style sheets and other document-centric tools. If a conditionalized XML tree structure contains child tree structures that are also conditionalized, the parent condition are determined to be true before the child conditions are considered. Whatever software is used to evaluate conditions does not attempt to pre-assign values to variables in the conditions unless it is known that the values will be needed. Variables are globally defined and can be assigned only one value during processing of a document tree that refers to the variable (providing an example of declarative semantics).

In the following example of conditional markup in accordance with one implementation, section 1.1 and all subsections are conditionalized by the expression materialType="Aluminum"

In the present example, a "wiz" namespace prefix is used to indicate data-centric markup and a "doc" namespace prefix is used to indicate document-centric markup. The conditional markup is as follows:

```
<doc:section number="1.1">
    <wiz:condition>
        <wiz:compareStrings>
            <wiz:eq>
                <wiz:stringVariable variableName="materialType">
                <wiz:string>Aluminum</wiz:string>
            </wiz:eq>
        </wiz::compareStrings>
    </wiz:condition>
    <doc:paragraph> this is the first paragraph</paragraph>
    <doc:section number="1.1.1">
        <doc:paragraph>this is a paragraph subsection</paragraph>
    </doc:section>
</doc:section>
```

In the following markup, a paragraph is conditionalized by a Boolean variable "highTemperature",

```
<doc:paragraph>
  <wiz:condition>
    <wiz:conditionVariable variableName="highTemperature"/>
  </wiz:condition> when installing structural components
near jet engines...
</doc:paragraph>
```

In other or additional implementations, a conditional expression may be allowed to wrap what is being conditioned. Generally, simpler schemas can be used where conditional expressions are not allowed to wrap what is being conditioned.

Data-centric markup can also be used to identify discrete data values within document-centric markup. The markup can assign the discrete values to variables that are represented abstractly, in the same or a similar manner as described in relation to conditional markup. Accordingly, adding new variables to the document does not impact the existing semantic-independent schema. However, the governing master information model would be changed in order to manage the variable and its allowed values. Variables defined by the markup are global and, as an example of declarative semantics, can only take on a single value. A variety of tags are possible to identify discrete data-centric values. New data-centric tags can be added as desired.

An example of markup follows in which a discrete value is assigned to a variable. A keyCharacteristic tag is used to assign a number to a variable within a document paragraph:

```
<paragraph>The preferred temperature is:
  <wiz:KeyCharacteristic variableName="temperature">120
  </wiz:KeyCharacteristic>
</paragraph>
```

The following example shows how several data-centric tags may be used to convert a document-centric table into one that supports table lookup (in addition to table rendering for a document.) A map_to_variable tag ties table columns to data-centric variables. In the present example, tags without the "wiz" namespace prefix conform to the Computer Aided Logistics Support (CALS) table model. Tags having the "wiz" namespace prefix add structure for supporting table lookup. It is also possible to add conditions to table cells, thereby allowing for the overriding of table cell values under certain conditions.

```
<table name="T1">
  <tgroup>
    <colspec colnum="col1">
      <wiz:map_to_variable><wiz:stringVariable
        variableName="x"/>
      </wiz:map_to_variable>
      <wiz:map_to_variable><wiz:stringVariable
        variableName="y"/>
      </wiz:map_to_variable>
    </colspec>
    <tbody>
      <row>
        <entry><wiz:number>23</wiz:number></entry>
        <entry><wiz:number>460</wiz:number></entry>
      </row>
      <row>
        <entry><wiz:number>24</wiz:number></entry>
        <entry><wiz:number>480</wiz:number></entry>
      </row>
```

-continued

```
    </tbody>
  </tgroup>
</table>
<wiz:resolve>
  <wiz:variables><wiz:numberVariable variableName="y"/>
  </wiz:variables>
  <wiz:usingTable name="T1">
</wiz:resolve>
```

In the information system 10, different document types may entail the use of different data-centric markup features. Additionally or alternatively, data modeling requirements tend to evolve over time. Accordingly, in various implementations, XML Schema Substitution Groups and Chameleon Schema Modules can be used to allow an open-ended set of variations of data-centric markup to be combined with document-centric markup without impacting the document-centric portion of the schema being used.

In various implementations of the disclosure, and external to the structuring of data-centric and document-centric markup, one or more ontologies are used to manage the names and types of variables referred to in data-centric markup. One implementation of a method used to manage data and its documentation is indicated generally in FIG. 4 by reference number 300. The method 300 can be used, for example, in relation to the information system 10 of FIG. 1, to validate data used in a plurality of different applications and described by various data models that may change over time. In such manner, a single authoritative data source (e.g., stored in the database 30) can be provided that can be used to generate documents and/or data feeds to the various applications.

Figure 4:
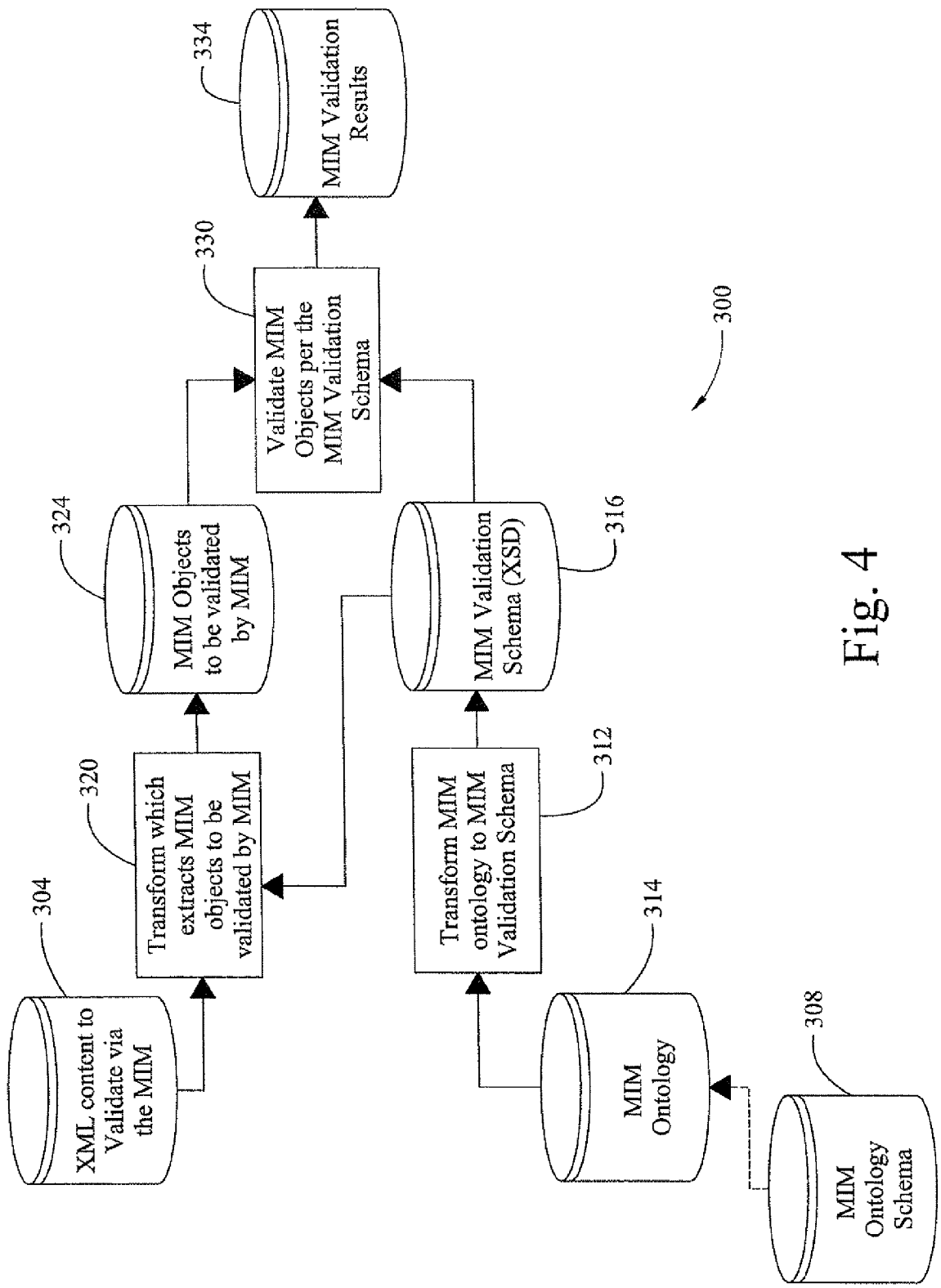
FIG. 4 is a flow diagram of method of managing data in accordance with one implementation of the present disclosure.

Referring now to FIG. 4, the method 300 is used to validate content 304, e.g., structured in accordance with a semantic-independent schema. Embedded in the content 304 are one or more data-centric components transformable to reference semantic data without affecting the other components of the content. In the present example, the content 304 is XML content structured to include data-centric markup and document-centric markup via the XML schema as discussed above. It should be noted, however, that other or additional semantic-independent schemas could be implemented in relation to data models maintained in the information system 10.

In various implementations, an ontology schema 308 is used to obtain one or more ontology(s) 34 describing concepts and relationships in the various data models in use in the information system 10. It should be noted that there is no requirement for ontologies to be defined to be semantically compatible with one another. In the present example, one ontology 34 is shown. The ontology 34 may be implemented using the OWL ontology language as the ontology schema 308. OWL is based on description logics and uses the "open world" assumption as known in the art. It should be understood, however, that any standard ontology language could be used to implement the ontology 34. The ontology 34 is used to reason about properties of a domain of the concepts being modeled. In the present example, the domain includes aircraft design, production and maintenance. The ontology 34 includes classes, relationships, and constraints defined using the ontology language 308. The classes, relationships, and constraints describe concepts modeled in the data models implemented in the information system 10. For example, ontology classes could include electrical connectors and related assembly and installation processes used on commercial aircraft.

In a process 312, the ontology 34 is transformed to a validation schema 316. More specifically, a subset of ontology statements that can be used for validating the content 304 is transformed to the validation schema 316. The subset may include, e.g., class definitions, inheritance relations, data types, and/or cardinality constraints. The transforming directly generates the validation schema 316, which in the present example is implemented in XML Schema (XSD). It should be noted that the validation schema 316 implements a "closed-world" assumption that allows validation of individual instances of ontology classes descriptive of data models in the information system 10. The validation schema 316 may be coded using Named Model Groups in such a way as to enable multiple inheritance, which is not intrinsically supported in XML Schema. The following example shows the use of model groups:

```
<xs:group name="thing">
    <xs:sequence/>
        <xs:element name="name" type="xs:string" minOccurs="0"/>
    </xs:sequence>
</xs:group>
<xs:group name="tangibleThing">
    <xs:sequence>
        <xs:group ref="thing"/>
        <xs:element name="location"/>
    </xs:sequence>
</xs:group>
<xs:group name="temporalThing">
    <xs:sequence>
        <xs:group ref="thing"/>
        <xs:element name="timeSpan"/>
    </xs:sequence>
</xs:group>
<xs:group name="object">
    <xs:sequence>
        <xs:group ref="tangibleThing"/>
        <xs:group ref="temporalThing"/>
        <xs:element name="attr1" type="xs:string"/>
        <xs:element name="attr2" type="xs:string"/>
        <xs:element name="attr3" type="xs:string"/>
    </xs:sequence>
</xs:group>
```

An object mapping service process 320, is used to transform the data-centric components of the content 304 into one or more objects 324 based on the domain of the ontology 34. The process 320 maps the data-centric components, e.g., variables included in data-centric markup as previously described, for use by the validation schema 316. More specifically, names for classes, attributes and relations are transformed to XML element names or XML attribute names. The transformation process 320 locates and extracts the data-centric content from the XML content 304 and structures it into a set of objects (including attributes and relationships) encoded in XML in accordance with the validation schema 316.

In the information system 107 data tends to be of many classifications, each class including relatively few instances. Furthermore, the classes often are not explicitly defined in the content 304, not formally defined in the literature of a domain of discourse (e.g. materials science) and evolve over time. Accordingly, content embedded in document-centric markup as previously described tends to be limited to attribute-value pairs. Classes frequently are not defined. Such content could contain, for example:

```
<wiz:domain name="nut and bolt installation"/>
<paragraph>Drill a hole within the range:
```

-continued

```
<wiz:KeyCharacteristic variableName="minHoleSize">
    <parameterValue unit="inches">0.34<parameterValue>
</wiz:KeyCharacteristic>
to
<wiz:KeyCharacteristic variableName="maxHoleSize">
    <parameterValue unit="inches">0.35<parameterValue>
</wiz:KeyCharacteristic>
</paragraph>
```

The object mapping service 320 can infer appropriate classes using disambiguation rules based on domain names defined by the ontology and assigned to the content. In the example above, if the assigned domain is a product domain, for example, the domain of "nut and bolt installation", the attributes and values for minimum and maximum hole size would be mapped, e.g., to a "drill-hole" class.

Objects derived by the object mapping service 320 may be transitory and are used to support a validation process 330. In the validation service process 330, objects derived by the object mapping service 320 are validated in accordance with the validation schema 316. Validation may be implemented, for example, using a standard XML Schema validator such as the Apache Xerces validator. Validation results 334 include the results of the validator tool being used. In various implementations, the validation schema 316 is designed so that validation error messages are presented in terms of the subject ontology 34.

The foregoing systems and methods make it possible for all systems in an enterprise that use information relating to a given subject to interoperate with a single set of authoritative data. Ontology models for semantic content of large document collections can be allowed to change over time without impact to systems used to author, manage and/or publish the content. Accordingly, systems for authoring, management and/or publishing can be developed without having conceptual models "hard coded" into their design. Further, multiple ontology models can be used simultaneously for the same content. Various implementations make it possible for a diverse and evolving collection of software systems, databases, and repositories of documents with semantic markup to interoperate coherently. Conceptual models can be implemented that are manageable across a suite of documents, to allow discrete data extraction to work across a family of interdependent documents.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of maintaining data described in a plurality of data models, the method comprising:
    using an ontology to describe the data models; and
    managing the data models using the ontology to support semantic usage of the data in content, the managing including using a validation schema to derive and validate one or more objects governed by the ontology, the one or more objects derived from one or more data-centric components of the content, the content having a structure semantically independent of the ontology;
    wherein the managing is neutral relative to implementation of the content.

2. The method of claim 1, further comprising using a semantic-independent schema to provide the semantically independent structure to the content.

3. The method of claim 2, comprising embedding data-centric markup in document-centric markup in accordance with the semantic-independent schema.

4. The method of claim 1, further comprising:
using an open-world assumption to structure the ontology; and
using a closed-world assumption to structure the validation schema.

5. The method of claim 1, further comprising generating a report of results of the validating.

6. The method of claim 1, wherein a domain of the ontology includes aircraft design, production, and maintenance.

7. A method of managing data to support usage of the data in content, the method comprising:
describing concepts of a plurality of models of the data in an ontology;
structuring content in accordance with a semantic-independent schema that does not model the subject matter of the data, the structuring including embedding in the content one or more data-centric components transformable to incorporate the data into the content without affecting other components of the content structure;
deriving a validation schema from the ontology; and
using the validation schema, creating a transform for extracting one or more objects from the data-centric components and validating the one or more extracted objects to validate the content.

8. The method of claim 7, wherein the describing is performed independently of the semantic-independent schema.

9. The method of claim 7, wherein describing concepts in an ontology comprises using an open-world assumption, and using the validation schema comprises using a closed-world assumption.

10. The method of claim 7, wherein structuring content in accordance with the semantic-independent schema comprises embedding data-centric markup within document-centric markup to structure a document.

11. The method of claim 7, wherein deriving a validation schema comprises transforming one or more statements of the ontology into the validation schema.

12. The method of claim 7, wherein a domain of the ontology includes aircraft design, production, and maintenance.

13. The method of claim 7, further comprising structuring the validation schema to provide for multiple inheritance.

14. The method of claim 7, further comprising generating a report of results of the validating.

15. A method of managing data for incorporation into content, the data described in a plurality of data models changeable over time, the method comprising:
describing the data models in an ontology;
providing a structure for the content using a semantic-independent schema that does not model the subject matter of the data;
including in the content structure one or more data-centric components transformable to relate semantically to the ontology and configured to allow semantic-independent implementation of the content structure;
transforming and semantically relating the one or more data-centric components to the ontology, the transforming and semantically relating performed using a validation schema derived from the ontology; and
validating the transformed components relative to the ontology to validate the content.

16. The method of claim 15, further comprising incorporating the data into the content while preserving the semantic-independent structure.

17. The method of claim 15, wherein the content includes a document, the method further comprising using variables to condition a data-centric markup within a document-centric markup for producing the document.

18. The method of claim 15, further comprising generating a report of results of the validating.

19. The method of claim 15, wherein describing concepts in an ontology comprises using an open-world assumption, and the validating comprises using a closed-world assumption.

20. The method of claim 15, wherein the validating comprises structuring the validation schema to provide for multiple inheritance.

* * * * *